United States Patent Office 2,745,856
Patented May 15, 1956

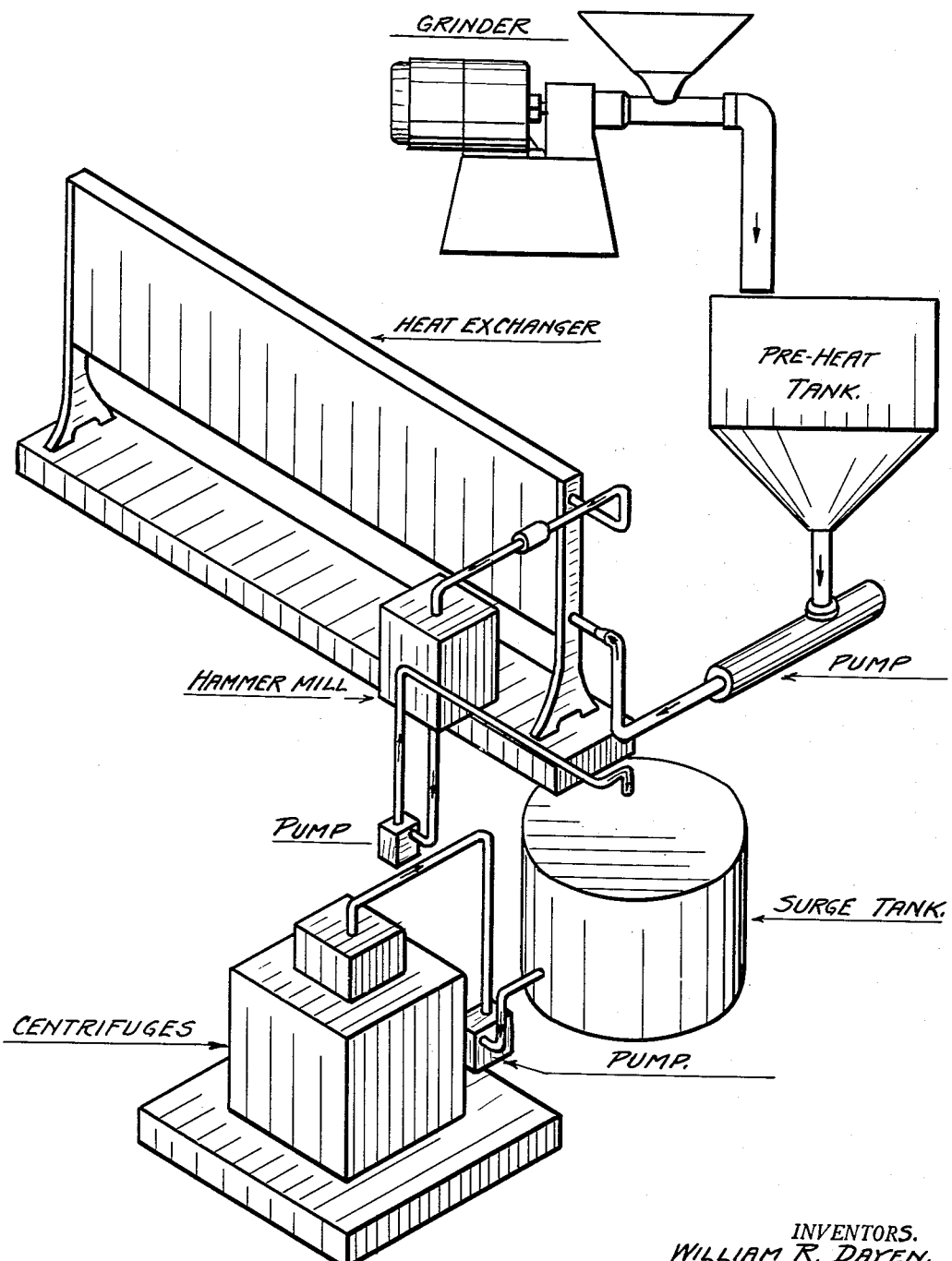

2,745,856
METHOD OF RENDERING ANIMAL FATS

William R. Dayen and Kenneth M. Christensen, Indianapolis, Ind., assignors, by mesne assignments, to Hygrade Food Products Corporation, Detroit, Mich., a corporation of New York Application April 30, 1952, Serial No. 285,176

7 Claims. (Cl. 260—412.6)

This invention relates to a method for the continuous rendering of animal fats and has for its object the processing of animal fats not only in a continuous operation such as to effect a saving in time and reduction in production costs, but with the most economical equipment.

In addition to the above it is a further object of the invention to render animal fats with a maximum of yield, and an improvement in the quality of the oil produced. By means of the method herein disclosed, all factors involved in the rendering of animal fat are favorably determined, including the elimination of tank water and refining operations, rendering without prolonged contact with heated surfaces, together with a substantial saving in labor, floor space, power requirements and capital equipment costs.

It has heretofore been the practice to render animal fats through the use of heat alone, using temperatures of 300–450 degrees F. supplied by external firing. More recent developments in the art have included the practice of reducing the particle size of the animal fat by mechanical means before rendering, i. e., through the medium of meat grinders and live steam. Under this practice the animal fats were rendered in pressure vessels using temperatures of 200–300 degrees F., with the rendering time materially reduced through the reduction in particle size before rendering. However, clarification of the oil from the tissue and water was effected by gravity settling and filtration.

In the various methods heretofore employed there were varying detrimental aspects in respect to the time required to effect the rendering, the relatively high and somwhat uncontrolled temperatures, the yield obtained and the quality of the product produced.

By means of the present invention the quality values are far beyond those accepted as being excellent, the yield produced approaches the absolute maximum, the power requirements are reduced to a fraction of that required by other methods, and the processing time is reduced to a matter of seconds.

The full nature of the invention will be understood from the accompanying drawing and the following description and claims.

The drawing is a schematic illustration of the various steps involved in the processing of animal fats according to this invention.

As schematically illustrated in the drawing, the animal fats, such as pork or beef, are ground through a special type of meat grinder having a plate size ranging from five-eighths of an inch to one-eighth of an inch. The grinding step reduces the animal fats to particles of predetermined size. Such fat particles are then conveyed to an open type of preheater tank having a heat source of 160–170 degrees F., and in which the fat particles are brought to a temperature of 100–120 degrees F. to render them fluid. The preheated fluid fat may then be pumped by a positive displacement progressing cavity type pump through a counter-current type tubular heat exchanger of such length as to achieve by heat transfer a temperature sufficient to coagulate the animal tissue or the animal protein. Such heat exchanger may have a heat source of 160–170 degrees F. heating the fluid fat to the same temperature at the discharge outlet on the order of 160–170 degrees F.

The resulting processed fluid fat is then put through a comminuting device such as a hammer type mill, preferably having a screen size of thirty-one thousandths of an inch for rendering and disintegrating the fat containing tissues to a sub-animal fat cell size on the order of fifty to one hundred microns whereby the same becomes non-fibrous. From the hammer mill the rendered and distintegrated fatty tissues are pumped to a surge tank wherein the proper centrifuging temperature is achieved at approximately 150–200 degrees F. at its discharge. From the surge tank and at the desired centifuging temperature, the fat is delivered to a centrifugal device wherein it is centrifuged to separate the oil, water and solids or protein matter.

A specific example of the method of carrying out the new process is as follows:

Animal fat, such as pork or beef fat, is ground to a particle size in the range of about ⅛ to ⅝ inch, using a meat grinder of the type described hereinabove. The ground fat is warmed to about 100 to 120° F., whereby the edges of the particles are softened and the ground mass behaves like a fluid and can be pumped through pipes into a heat exchanger, where the ground fat is brought to a temperature within the range of about 160 to 170° F. in the course of its passage. At this temperature, the connective tissue or animal protein contained therein is coagulated. The fat is then ground or disintegrated in a hammer mill and the particles are reduced to a size below that of the original fat cells, whereupon the fat is released. The disintegrated mass is thereafter subjected to the action of a centrifuge, while maintaining the temperature thereof in the range of about 150 to 200° F. to keep the rendered fat liquid. The water, coagulated protein matter and solids are in this way separated from the liquid fat.

The above described method results in a product having qualities heretofore acceptable as being excellent and of a relatively long keeping quality, the yield approaching the absolute maximum, and wherein the processing time is reduced to a matter of seconds. For example, the method results in oleo stock with a yield of 89% to 92% having a keeping quality of thirty-one hours, and a moisture content as low as 0.2%.

The invention claimed is:

1. The method of continuously rendering fats which comprises coarsely grinding fat containing tissue, continuously feeding said ground tissue to a point of application of heat, heating the ground tissue thus fed to a relatively low temperature not high enough to coagulate said tissue but sufficient to melt the said fat, thereby to render the tissue effectively fluid, continuously pumping said fluidized tissue to a second point of application of heat, and continuously heating the fluidized tissue thus being fed under pressure to a temperature sufficient to coagulate the animal protein contained therein, continuously pumping said coagulated tissue to a rendering point, and thereafter rendering the tissue by continuously grinding the same to a sub-cellular non-fibrous state.

2. The method of continuously rendering fats which comprises coarsely grinding fat containing tissue, continuously feeding said ground tissue to a point of application of heat, heating the ground tissue thus fed to a relatively low temperature not high enough to coagulate said tissue but sufficient to melt the said fat, thereby to make the tissue effectively fluid, continuously pumping said fluidized tissue to a second point of application of heat, continuously heating the fluidized tissue thus being fed under pressure to a temperature sufficient to coagulate the animal protein contained therein, continuously pumping said coagulated tissue to a rendering point, rendering the tissue by continuously grinding the same to a sub-cellular non-fibrous state, and separating the fluid fat portion from the resulting coagulated protein matter and water portions thereof.

3. The process of continuously rendering fats which comprises grinding fat containing tissue to particles ranging in size from about one-eighth to about five-eighths inch, continuously feeding said ground tissue to a point of application of heat, heating the ground tissue thus fed to a temperature in the range of about 100 to 120° F. to make it effectively fluid, continuously pumping said fluidized tissue to a second point of application of heat, continuously heating the fluidized tissue thus being fed under pressure to a relatively high temperature sufficient to coagulate the animal protein contained therein, continuously pumping said coagulated tissue to a rendering point, and thereafter rendering the tissue by continuously grinding the same to a particle size in the range of about fifty to one-hundred microns, and separating the fluid fat portion thereof from the coagulated protein matter and water portions thereof.

4. The process of continuously rendering fats which comprises grinding fat containing tissue to a particle size in the range of about one-eighth inch to about five-eighths inch, continuously feeding said ground tissue to a first point of application of heat, heating the tissue thus fed to a temperature in the range of about 100 to about 120° F. to make it effectively fluid, continuously pumping the said fluidized tissue to a second point of application of heat, continuously heating the fluidized tissue thus being fed under pressure to a relatively high temperature sufficient to coagulate the animal protein contained therein, continuously pumping the coagulated tissue to a rendering point, and thereafter rendering the tissue by continuously grinding the same to a sub-cellular non-fibrous state, and separating the fluid fat portion thereof from the coagulated protein and water portions thereof.

5. The process of continuously rendering fat, which comprises grinding fat containing tissue to particles ranging in size from about one-eighth to about five-eighths inch, continuously feeding said ground tissue to a first point of application of heat, heating the ground tissue thus being fed to a temperature in range of about 100 to 120° F. to make it effectively fluid, continuously pumping said fluidized tissue to a second point of application of heat, continuously heating the fluidized tissue thus fed under pressure to a relatively high temperature sufficient to coagulate animal protein contained therein, continuously pumping said coagulated tissue to a rendering point, and thereafter rendering the tissue by continuously grinding the same to a particle size in the range of about fifty to one hundred microns, bringing the rendered tissue to a temperature in the range of about 150 to 200° F., and separating the fluid fat portion from the protein and water portions thereof.

6. The process of continuously rendering fat which consists in grinding fat containing tissue to particles of about one-eighth inch in size, continuously feeding said ground tissue to a first point of application of heat, heating the ground tissue thus being fed to about 100° F. to make it effectively fluid, continuously pumping said fluidized tissue to a second point of application of heat, continuously heating the fluidized tissue thus fed under pressure to a relatively high temperature sufficient to coagulate the animal protein contained therein, continuously pumping said coagulated tissue to a rendering point, and thereafter rendering the tissue by continuously grinding the same to a particle size of about fifty microns, heating the rendered tissue to about 150 F., and separating the fluid fat portion from the protein and water portions thereof.

7. The process of continuously rendering fat which consists in grinding fat containing tissue to particles of about five-eighths inch in size, continuously feeding said ground tissue to a first point of application of heat, continuously heating the ground tissue thus fed to about 120° F. to make it effectively fluid, continuously pumping said fluidized tissue to a second point of application of heat, heating the fluidized tissue thus being fed under pressure to a relatively high temperature sufficient to coagulate the animal protein contained therein, continuously pumping said coagulated tissue to a rendering point, and thereafter rendering the tissue by continuously grinding the same to a particle size of about one hundred microns, heating the rendered tissue to about 200° F., and separating the fluid fat portion from the protein and water portions thereof.

References Cited in the file of this patent
UNITED STATES PATENTS

| | | |
|---|---|---|
| 137,698 | Marshall | Apr. 8, 1873 |
| 705,034 | Cameron | July 22, 1902 |
| 2,388,284 | Ratner | Nov. 6, 1945 |
| 2,467,529 | Hormel | Apr. 19, 1949 |
| 2,468,636 | Napier | Apr. 26, 1949 |
| 2,616,910 | Pavia | Nov. 4, 1952 |
| 2,697,112 | Kramer | Dec. 14, 1954 |